US010425252B2

(12) United States Patent
Hussain et al.

(10) Patent No.: US 10,425,252 B2
(45) Date of Patent: Sep. 24, 2019

(54) AUTOMATIC NETWORK-WIDE SERVICE CONFIGURATION SYSTEM AND METHOD

(71) Applicant: Infinera Corp., Annapolis Junction, MD (US)

(72) Inventors: Iftekhar Hussain, Santa Clara, CA (US); Snigdho C. Bardalai, San Ramon, CA (US); Krish Verma, Sunnyvale, CA (US); Murugan Rajagopal, Sunnyvale, CA (US)

(73) Assignee: Infinera Corp., Sunnyvale, CA (US)

( * ) Notice: Subject to any disclaimer, the term of this patent is extended or adjusted under 35 U.S.C. 154(b) by 282 days.

(21) Appl. No.: 15/094,703

(22) Filed: Apr. 8, 2016

(65) Prior Publication Data

US 2016/0301630 A1  Oct. 13, 2016

Related U.S. Application Data

(60) Provisional application No. 62/144,613, filed on Apr. 8, 2015.

(51) Int. Cl.
*H04L 12/931* (2013.01)
*H04L 12/46* (2006.01)
*H04L 29/06* (2006.01)

(52) U.S. Cl.
CPC ............ *H04L 12/465* (2013.01); *H04L 69/22* (2013.01)

(58) Field of Classification Search
None
See application file for complete search history.

(56) References Cited

U.S. PATENT DOCUMENTS

| 8,223,803 | B2 | 7/2012 | Sprague |
| 2011/0164617 | A1* | 7/2011 | Yong ........................ H04L 45/04 370/392 |
| 2016/0173329 | A1* | 6/2016 | Latham ............... H04L 41/0806 370/254 |

OTHER PUBLICATIONS

Moy, J., "OSPF Version 2," RFC 2328, The Internet Society, Apr. 1998.
ITU-T, "Interfaces for the Optical Transport Network (OTN)", ITU-T G.709-v3 Recommendation, Dec. 2009.
(Continued)

*Primary Examiner* — Ayaz R Sheikh
*Assistant Examiner* — Sori A Aga
(74) *Attorney, Agent, or Firm* — David L. Soltz; Dunlap Codding, P.C.

(57) ABSTRACT

Systems and methods are disclosed including a method comprising: receiving, with a controller having a computer processor, a preservation status input from a user indicative of whether or not to preserve a virtual local area network (VLAN) tag in a header of a data packet transmitted within an Ethernet local area network (E-LAN), the VLAN tag identifying at least one of customer information and service provider information for the data packet in the E-LAN, wherein the E-LAN comprises network devices having physical ports and is configured to allow multiple customers use of an individual physical port; determining a scalable network-wide service configuration model having multiple predetermined rules for automatically configuring the physical ports of the network devices for the E-LAN based on the preservation status input from the user; and configuring automatically, with the controller, the physical ports of the network devices using the predetermined rules of the configuration model.

16 Claims, 10 Drawing Sheets

(56) References Cited

OTHER PUBLICATIONS

IEEE, "Bridges and Bridged Networks," IEEE Standard 802.1Q-2014, Dec. 19, 2014.
ITU-T, "Generic functional architecture of transport networks", ITU-T G.805 Recommendation, Mar. 2000.
ITU-T, "Architecture of optical transport networks", ITU-T G.872 Recommendation, Nov. 2001.
ITU-T, "Information technology—Open Systems Interconnection—Basic Reference Model: The basic model," ITU-T X.200, Jul. 1994.
IEEE, "Provider Bridges," IEEE Standard 802.1ad-2006, Aug. 2005.
Silvano Gai, "An Engineering Guide to IEEE 802.1Q and IEEE 802.1p", Jan. 6, 1999.

\* cited by examiner

AUTOMATIC NETWORK-WIDE SERVICE CONFIGURATION SYSTEM AND METHOD

INCORPORATION BY REFERENCE

The present patent application claims priority to the provisional patent application identified by U.S. Ser. No. 62/144,613, filed on Apr. 8, 2015, entitled "Ethernet Service Model for Cloud Scale Network Applications," the entire contents of which are hereby incorporated herein by reference.

FIELD OF THE DISCLOSURE

The disclosure generally relates to methods and apparatuses for configuring data communication devices for Virtual Local Area Networks. More particularly, the disclosure, in part, relates to the formation and use of automatic network-wide service configuration models for configuration of ports of data communication devices for Virtual Local Area Networks, such as may be utilized in Ethernet services.

BACKGROUND

Generally, data transport networks are defined as having multiple "layers" that combine to make a network. For example, one standard that describes a multi-layer model is the International Telecommunication Union recommendation ITU-T X.200 (07/94), entitled "Information technology—Open Systems Interconnection—Basic Reference Model: The basic model." The Open Systems Interconnection (OSI) Model contains the following seven layers: the Application Layer (layer 7), the Presentation Layer (layer 6), the Session Layer (layer 5), the Transport Layer (layer 4), the Network Layer (layer 3), the Data Link Layer (layer 2), and the Physical Layer (layer 1). The model may also include a Layer Zero containing transmission media.

Data transport networks, such as Optical Transport Networks (OTNs), are generally comprised of a plurality of data communication network devices known as switch nodes (also referred to as "nodes") linked together to form a network. The OTN includes an electronic layer and an optical layer. The electronic layer and the optical layer each contain multiple sub-layers. The optical layer provides optical connections, also referred to as optical channels or lightpaths, to other layers, such as the electronic layer. The optical layer performs multiple functions, such as monitoring network performance, multiplexing wavelengths, and switching and routing wavelengths. In general, the OTN is a combination of the benefits of SONET/SDH technology and dense wavelength-division multiplexing (DWDM) technology (optics). OTN structure, architecture, and modeling are further described in the International Telecommunication Union recommendations, including ITU-T G.709, ITU-T G.872, and ITU-T G.805, which are well known in the art.

Typically, packet switched network systems are interconnected using wavelengths from the optical transmission backbone (the transport layer) that may contain a mix of WDM (optical) transmission and/or OTN (Digital) switching technologies and/or packet switching technologies. Traffic engineers may set or pre-engineer a path for a data traffic flow through the packet switched layer of the network, or the path may be computed using native routing protocols within the packet switched layer.

An Ethernet Virtual Local Area Network (VLAN) is a group of network devices on one or more Local Area Networks (LAN), such as one or more Ethernet Local Area Networks (E-LAN), that are configured to communicate as if they are in the same physical location, when, in fact, the devices may be located on two or more different LAN segments. A VLAN can be considered an independent logical network within one or more physical networks. VLANs operate at layer 2 of the Open Systems Interconnection (OSI) Model. The VLAN allows a single individual physical port on a network device to be used for multiple customers.

VLAN Tagging is the practice of inserting VLAN identification information into a data header of a data packet in order to identify to which VLAN the packet belongs. The switch nodes in the network may use the VLAN identification information to determine which port(s) or interface(s) to send the data packet, or broadcast data packet.

However, individual VLANs may use differing identification information for the same client or service provider. When a network operator configures a path through a network, such as a LAN, or between two or more networks, the network operator must configure the ports of each endpoint network device to switch or maintain or strip the VLAN information based on the individual network upon ingress to, and egress from, the network.

Currently, the process of configuring the endpoint network devices is carried out manually. The current process is time consuming and error prone. An error in the configurations of the ports may result in delay, or failure, of data traffic delivery and/or loss of connectivity to network devices. In the past, the network scale was moderate. As data transport networks grow in size, manual configuration is unable to meet the demands for timeliness of responses to client requirement changes and quality of service. The increases in network sizes, such as the increase due to cloud scale applications, creates technological problems that necessitate a technical solution, specific to data transport networks, for automated improved network configuration systems and methods to provision network services rapidly to meet new applications' requirements.

SUMMARY

Methods and systems are disclosed that automatically provide for network-wide service configuration of data transport networks, such as automatic configuration of ports of nodes in Ethernet Local Area Networks (E-LAN) for Virtual Local Area Network (VLAN) switching. In some embodiments, the system is provided with a controller that determines a scalable network-wide service configuration model having multiple predetermined rules for automatically configuring physical ports of network devices for the E-LAN based on preservation status input, and automatically configures the physical ports of the network devices using the predetermined rules of the configuration model.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
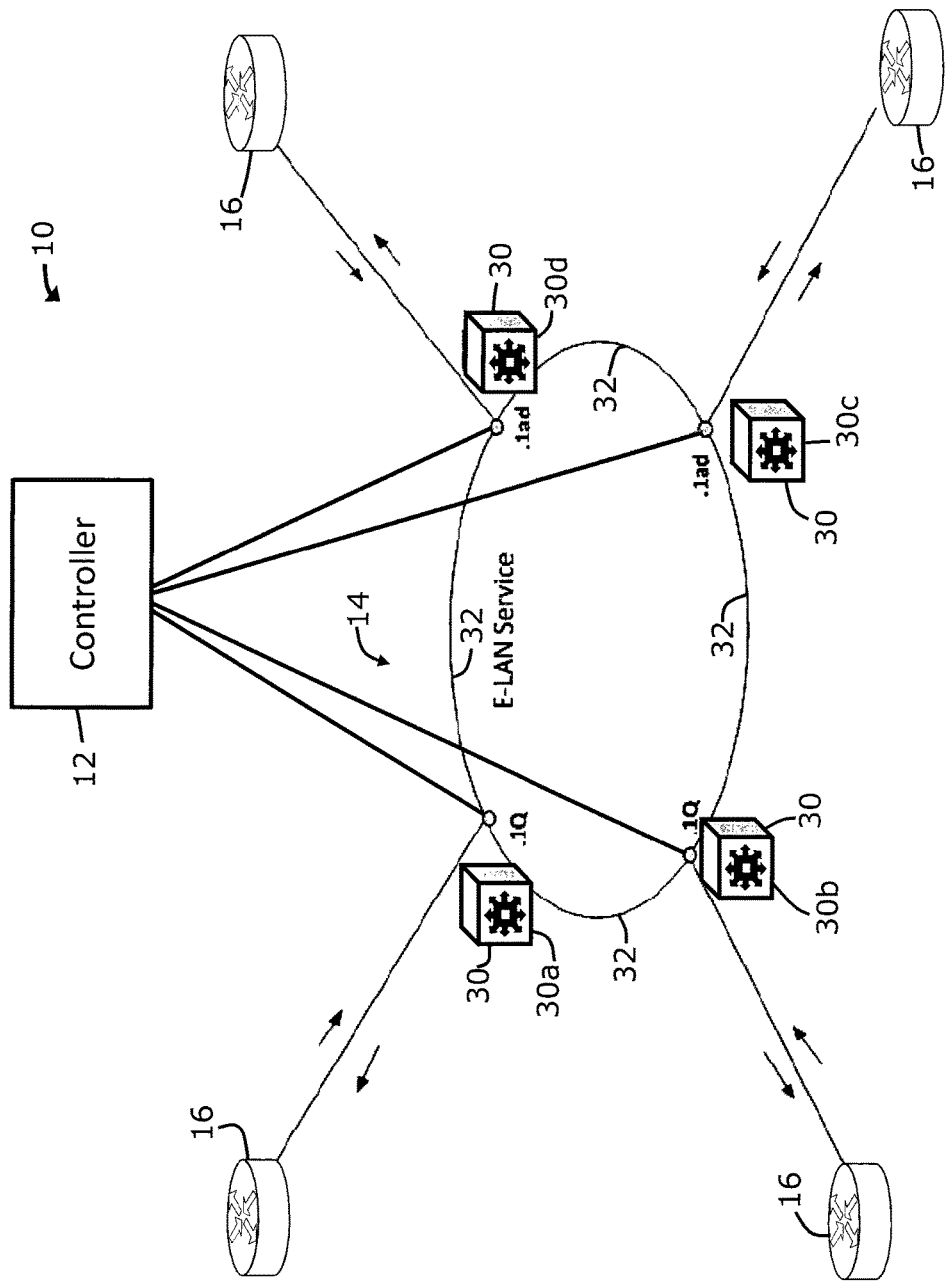
FIG. 1 is a block diagram showing an exemplary automatic network-wide service configuration system in accordance with the present disclosure.

The following detailed description refers to the accompanying drawings. The same reference numbers in different drawings may identify the same or similar elements.

The mechanisms proposed in this disclosure provide network-wide service configuration models for VLAN switching in Ethernet networks. The present disclosure describes methods which include receiving, with a computer processor of a controller via an input device communicating with the computer processor, a preservation status input from a user indicative of whether or not to preserve a virtual local area network (VLAN) tag in a header of a data packet transmitted within an Ethernet local area network (E-LAN), the VLAN tag identifying at least one of customer information and service provider information for the data packet in the E-LAN, wherein the E-LAN comprises network devices having physical ports interconnected with communication links, and wherein the E-LAN is configured to allow multiple customers use of an individual physical port. The methods further comprise determining, with the computer processor of the controller, a scalable network-wide service configuration model having multiple predetermined rules for automatically configuring the physical ports of the network devices for the E-LAN based on the preservation status input from the user; and transmitting a series of signals by the computer processor via an output device communicating with the computer processor to configure automatically, with the controller, the physical ports of the network devices using the predetermined rules of the configuration model.

In one embodiment, the physical ports include a first physical port configured to read a single VLAN tag and/or a second physical port configured to read multiple VLAN tags. The first physical port may be configured to conform to rules set forth in the Institute of Electrical and Electronics Engineers (IEEE) standard identified as 802.1Q. The second physical port may be configured to conform to rules set forth in the Institute of Electrical and Electronics Engineers (IEEE) standard identified as IEEE 802.1ad.

In one embodiment, the preservation status input comprises at least two preservation status orders chosen from a group consisting of: preserving service provider VLAN tags, preserving customer VLAN tags, not preserving service provider VLAN tag, not preserving customer VLAN tags, and maintaining an empty status of the VLAN tags.

In one embodiment, the predetermined rules are chosen from a group of actions consisting of: editing customer and service provider VLAN tags for data packets coming into the E-LAN; preserving customer and service provider VLAN tags for data packets coming into the E-LAN; editing customer VLAN tags but preserving service provider VLAN tags for data packets coming into the E-LAN; editing service provider VLAN tags but preserving customer VLAN tags for data packets coming into the E-LAN; and maintaining an empty status of the VLAN tags. In one embodiment, editing customer and/or service provider VLAN tags for data packets coming into the E-LAN further comprises removing, adding, and/or exchanging the information in the customer and/or service provider VLAN tags for new information indicative of VLAN identification particular to the network which the data packet is entering.

In one embodiment, the chosen actions for the predetermined rules include predetermined rules for the reversal of the actions upon egress of the data packet from the E-LAN.

In one embodiment, the method may further comprise, determining for each physical port whether the physical port is configured to read multiple VLAN tags in the data packet or a single VLAN tag in the data packet.

In one embodiment, the method may further comprise, determining that one of the physical ports is configured to read only the outer VLAN tag in the data packet; and configuring the physical port using the predetermined rules of the configuration model for the outer VLAN tag.

In one embodiment, a system may comprise an Ethernet local area network (E-LAN) comprising a plurality of network devices having physical ports interconnected with communication links, wherein the E-LAN is configured to allow multiple customers use of an individual physical port. The system may further comprise a controller having an input device, an output device, and a computer processor, the computer processor receiving a preservation status input from a user via the input device, the preservation status input indicative of whether or not to preserve a virtual local area network (VLAN) tag in a header of a data packet transmitted within the E-LAN, the VLAN tag identifying at least one of customer information and service provider information for the data packet in the E-LAN. The computer processor of the controller may determine a scalable network-wide service configuration model having multiple predetermined rules for automatically configuring the physical ports of the network devices for the E-LAN based on the preservation status input from the user, and may automatically transmit a series of signals via the output device, the series of signals having information that upon receipt by network devices configures the physical ports of the network devices using the predetermined rules of the configuration model.

Definitions

If used throughout the description and the drawings, the following short terms have the following meanings unless otherwise stated:

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IEEE stands for Institute of Electrical and Electronics Engineers. The IEEE is a professional association that also proposes and publishes industry standards for technologies including data transport networks and network devices.

IETF stands for Internet Engineering Task Force. The Internet Engineering Task Force (IETF) is a volunteer group dedicated to improving the Internet by proposing uniform standards for data transfer protocols, among other things. The IETF has recently extended GMPLS to allow for the transmission of more data through an Optical Transport Network (OTN). The IETF publishes Requests for Comment (RFC) detailing proposed standard protocols.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OTN stands for Optical Transport Network which includes a set of optical switch nodes which are connected by optical fiber links. ITU-T recommendations G.709 and G.872 define OTN interface requirements and network architecture respectively.

SDN, as used herein, stands for Software Defined Networking, which includes software, which may be executed by hardware that is separate from switch nodes within an optical transport network, and which includes the functionality to compute and provision paths through the optical transport network for multiple switch nodes as well as instruct one or more switch nodes to compute paths through the optical transport network. One protocol in SDN is known as OpenFlow. In general, the OpenFlow protocol allows decoupling the data plane and the control plane and enables remote configuration and switching from a remote central controller.

VLAN stands for Virtual Local Area Network. A VLAN is a group of network devices on one or more Local Area Networks (LAN), such as one or more Ethernet Local Area Networks (E-LAN), that are configured to communicate as if they are in the same physical location, when, in fact, the devices may be located on two or more different LAN segments. A VLAN can be considered an independent logical network within one or more physical networks. VLANs operate at layer 2 of the OSI Model. The VLAN allows a single individual physical port on a network device to be used for multiple customers VLAN Tagging is the practice of inserting VLAN identification information into a data header of a data packet in order to identify to which VLAN the packet belongs. The switch nodes in the network use the VLAN identification information to determine which port(s) or interface(s) to send the data packet, or broadcast data packet.

Description

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and in particular to FIG. 1, shown therein and designated by a reference numeral 10 is an exemplary automatic network-wide service configuration system 10 constructed in accordance with the present disclosure. The network-wide service configuration system 10 comprises a controller 12, a data transport network 14, and a plurality of customer computer devices 16.

Figure 2:
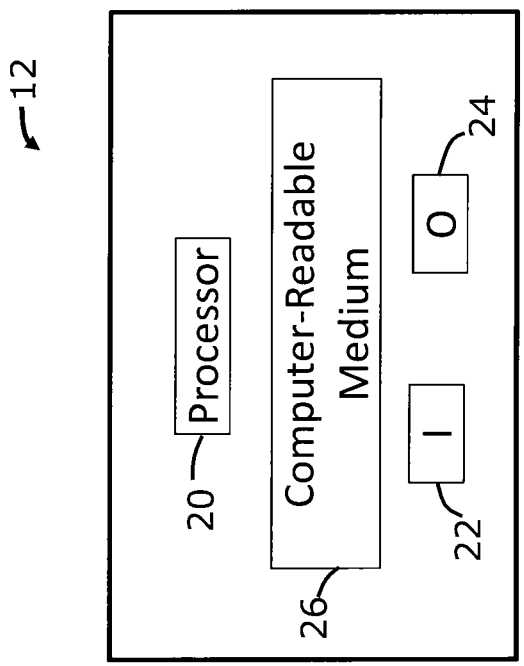
FIG. 2 is a block diagram of an exemplary controller constructed in accordance with the present disclosure.

As shown in FIG. 2, in general, the controller 12 is provided with one or more processors 20 (which is referred to hereinafter as "the processor 20"), one or more input devices 22, one or more output devices 24, and one or more non-transitory computer-readable medium 26 (hereinafter referred to as the "computer-readable medium 26"). In some implementations, the controller 12 may include additional components, fewer components, different components, or differently arranged components than those illustrated in FIG. 2. The controller 12 provides a network-wide centralized view of the full data transport network 14.

The processor 20 of the controller 12 is capable of communicating with the non-transitory computer-readable medium 26, the input device 22, and the output device 24, as well as reading and/or executing computer executable code. The processor 20 can be located at any location relative to the computer-readable medium 26, the input device 22, and the output device 24, as long as the processor 20 is able to communicate with the computer-readable medium 26, the input device 22, and the output device 24.

The processor 20 may, for example, be implemented as one or more microprocessors, one or more microcontrollers, one or more field-programmable gate arrays, one or more digital signal processors, one or more application-specific integrated circuit ("ASIC"), or the like. It is to be understood that the processor 20 may contain one, two, three, or a plurality of: microprocessors, microcontrollers, field-programmable gate arrays, digital signal processors, application-specific integrated circuits, or the like, or any combination thereof.

It will be understood that the controller 12 comprises hardware that is able to embody and/or execute the logic of the processes described herein. The logic embodied in the form of software instructions or firmware may be executed on hardware which may be a dedicated system or systems, or a personal computer system, or distributed processing computer system.

The input device 22 of the controller 12 functions to receive information and to supply the information to the processor 20 and can be constructed in various types or manners. The input device 22 may include any mechanism that permits a user to input information to the controller 12 (e.g., a keyboard, a keypad, a mouse, a button, a switch, one or more light-emitting diodes ("LEDs"), etc.). The output device 24 of the controller 12 functions to supply information from the controller 12 to another device and can be constructed in various types or manners. The output devices 24 may include any mechanism that outputs information (e.g., a display, a speaker, one or more light-emitting diodes ("LEDs"), etc.).

The input device 22 and the output device 24 may include any transceiver-like mechanism, such as a transceiver and/or a separate receiver and transmitter that enables the controller 12 to communicate with other devices and/or systems, such as via a wired connection, a wireless connection, or a combination of wired and wireless connections. For example, the input device 22 and the output device 24 may include mechanisms for communicating with the data transport network 14. Additionally, or alternatively, the input device 22 and output device 24 may comprise a logical component that includes input and output ports, input and output systems, and/or other input and output components that facilitate the transmission of data to and/or from other devices in the data transport network 14, such as an Ethernet interface, an optical interface, a coaxial interface, an infrared interface, a radio frequency ("RF") interface, a universal serial bus ("USB") interface, or the like.

The non-transitory computer-readable medium 26 of the controller 12 may include a random access memory ("RAM"), a read only memory ("ROM"), and/or any type of non-transitory dynamic or static storage device (e.g., a non-transitory flash memory, a non-transitory magnetic memory, or a non-transitory optical memory) that may store information and/or instructions for use by the processor 20 of the controller 12. The computer-readable medium 26 may be defined as a non-transitory memory device. The memory device may include space within a single storage device or space spread across multiple storage devices. The controller 12 may perform operations in response to the processor 20 executing software instructions contained in the computer-readable medium 26.

Software instructions may be read into the computer-readable medium 26 of the controller 12 from another computer-readable medium or from another device or may be input into the computer-readable medium. Software instructions stored in the computer-readable medium 26 may cause the processor 20 to perform processes that are described herein. Additionally, or alternatively, hardwired circuitry may be used in place of, or in combination with, software instructions to implement processes described herein.

Referring again to FIG. 1, and moving now to the data transport network 14 of the automatic network-wide service configuration system 10, the data transport network 14 comprises network devices 30 (hereinafter referred to as "nodes") connected via communication links 32 in order to transport data, including data packets. The data transport network 14 may be, for example, an optical transport network (OTN). The data transport network 14 may be organized, for example, as an Ethernet Local Area Network (E-LAN) configured for E-LAN service.

It will be understood that the data transport network 14 may further comprise additional interconnected managed entities capable of receiving and transporting information. The structure and type of the managed entities can vary and typical examples of managed entities include sub-network connections, cross-connects, ports, links, manual circuits, protection connections, and the like, which cooperate to form the data transport network. The data transport network 14 may include Layer 2/Layer 3 network entities such as routers. The data transport network 14 may include integrated ROADM and OTN network entities, providing L1 and L0 functionality.

For explanatory purposes, the illustrated data transport network 14 of FIG. 1 comprises a first node 30a, a second node 30b, a third node 30c, and a fourth node 30d, as well as a plurality of interconnecting communication links 32.

In the data transport network 14, the nodes 30 may be connected to the controller 12 and/or one another by the communication links 32. One or more optical channels carry data through the data transport network 14 over the nodes 30 and the communication links 32.

The communication links 32 can be physical links managed by software as a managed entity that is used to connect two nodes 30 together to establish communication there between. The communication links 32 can be implemented in a variety of ways, such as a physical link including electrical (e.g., copper wire or coax) and/or optical signal (e.g., optical fiber or other waveguide) carrying capabilities, or as a wireless link. The communication links 32 can be fiber optic cables, electronics cables, wireless communication links, or the like.

A particular node 30 that acts as a point of ingress to the data transport network 14 for a particular data packet may be referred to as an ingress node, an edge node, or a headend node. A particular node 30 that is an endpoint, or point of egress from the data transport network 14, may be referred to as an egress node, a tailend node, or an endpoint node. Nodes 30 within a particular path between the point of ingress to the data transport network 14 and the point of egress from the data transport network 14 may be referred to as a core node. For different paths through the network for data packets, a particular node 30 may act as an egress node, ingress node, and/or a core node.

Figure 3:
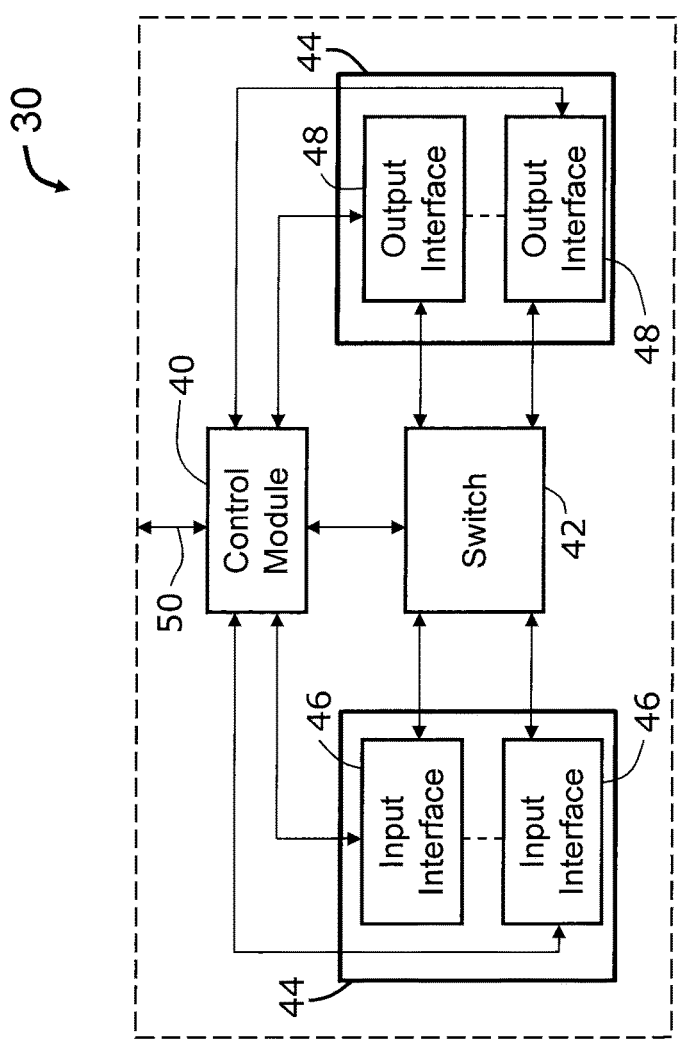
FIG. 3 is a block diagram of an exemplary node constructed in accordance with the present disclosure.

Referring now to FIG. 3, shown therein is a block diagram of an exemplary node 30 constructed in accordance with the present disclosure. The nodes 30 are adapted to facilitate the communication of data (which may be referred to herein as "traffic") between multiple nodes 30 in the data transport network 14. The nodes 30 may receive, read the headers of, forward, and/or direct data packets between the nodes 30 and/or the customer computer devices 16.

The node 30 is provided with a control module 40, a switch 42, and one or more physical ports 44 comprising one or more input interfaces 46 and/or one or more output interfaces 48. In general, the physical ports 44 are adapted to receive data traffic, such as data packets, from the data transport network 14 and/or the customer computer devices 16 and to transmit data traffic, such as data packets, onto the data transport network 14 and/or to the customer computer devices 16. The switch 42 serves to communicate the traffic from the input interfaces 46 to the output interfaces 48. The control module 40 serves to control the operations of the physical ports 44 and the switch 42, as well as, in some circumstances, to compute and set up label switched paths (LSP).

The node 30 may also include non-transitory memory (not shown), either within the control module 40 and/or the switch 42, or separate from the control module 40 and/or the switch 42.

The node 30 can be implemented in a variety of ways, including, commercial installations having one or more backplanes (not shown), racks, and the like. In this example, the physical ports 44, the control module 40 and the switch 42 are typically implemented as separate devices, which may have their own power supply, local memory and one or more processor, but which are installed within the same rack or installation of racks. In another example, the node 30 can be implemented as a single device having a shared power supply, memory and processing equipment. Or, in another example, the node 30 can be implemented in a modular manner in which one or more of the physical ports 44, the control module 40 and the switch 42 share a power supply and/or housing.

The ports 44 of one node 30 are adapted to communicate with the customer computer devices 16 and/or ports 44 of another node 30 within the data transport network 14 via the communication links 32, as shown in FIG. 1. An example of the physical port is an Ethernet card or optical port. The ports 44 of different nodes 30 may use different bridging technologies, such as bridging technologies conforming to IEEE 802.1Q standard or IEEE 802.1ad standard.

The physical port 44 of the node 30 may support multiple layers of the data transport network 14, such as the optical layer (i.e., OTN), Ethernet, MPLS layer, IP layer, and so on. The port 44 may check incoming data frames for errors (known as "phy" or physical layer functions). Once a valid data frame is recognized, the data frame may be classified based on configured predetermined rules using fields in the data frame, such as S-tags and/or C-tags, which will be further described below. In addition, the port 44 may carry out one or more operations on the data frame, such as one or more operations on the S-Tags and/or C-tags. For example, the port 44 may add information ("push"), delete and/or extract information ("pop"), and/or exchange information ("swap") in the data frame.

In general, each of the ports 44 and/or input interface(s) 46 and/or the output interface(s) 48 may have a unique logical identification, such as an IP address or Logical Port Number/Identifier. The input interfaces 46 and the output interfaces 48 may be of different combinations. For example, one or more input interfaces 46 may be Ethernet interfaces and one or more output interfaces 48 may be OTN interfaces.

The implementation of the input interface(s) 46 and the output interface(s) 48 will depend upon the particular type of communication link 32 with which the particular input interface 46 and/or output interface 48 is designed to communicate. For example, one of the input interfaces 46 can be designed to communicate wirelessly with the customer computer device 16 and/or another node 30 within the data transport network 14, while one of the output interfaces 48 of the node 30 can be designed to communicate optically through a fiber-optic link. For a particular node 30, the input interfaces 46 can be of the same type or different types; the output interfaces 48 can be of the same type or different types; and the input interface(s) 46 and output interface(s) 48 can be of the same type or different types.

The input interface 46 and the output interface 48 are shown separately for purposes of clarity. However, it should be understood that one or more of the input interfaces 46 and/or the output interfaces 48 could be connected to a single communication link 32 and implemented as a single device, such as a line module. Exemplary line modules are described in U.S. Pat. No. 8,223,803 (Application Publication number 20090245289), the entire contents of which are hereby incorporated herein by reference.

As discussed above, the control module 40 has its own processing capabilities and non-transitory memory and can execute data transport network protocols. The processing capabilities of the control module 40 may be implemented as one or more processors as discussed above. The control module 40 is also provided with a communication interface 50 configured to connect to a communication link 32 which is external to the node 30. The control module 40 utilizes the communication interface 50 to communicate with control modules 40 of other nodes 30 within the data transport network 14 and with the controller 12.

The controller 12 may send a signal to the control module 40 via the output device 24 of the controller 12, the signal including configuration information for the physical ports 44. The signal may contain one or more message having the configuration information. The message may conform with the OpenFlow protocol message format. The processor of the control module 40 receives the signal including the configuration information. The control module 40 provides instructions to the port 44 to configure the port 44 to conform to the configuration information from the controller 12. The port 44 may be configured with service information regarding how and when to carry out one or more operations on the data frame, such as one or more operations on the S-Tags and/or C-tags in the data frame. For example, the port 44 may be configured by the controller 12 to add information ("push"), delete or extract information ("pop"), and/or exchange information ("swap") in the data frame at ingress or egress of the data frame to the data transport network 14, based on predefined rules of a configuration model determined by the controller 12.

Management of the control module 40 can be implemented by setting bits within the memory of the control module 40 that can be interpreted by the processor of the control module 40. Likewise, allocation of particular resources of the ports can be implemented by setting bits within the memory of the ports. In some embodiments, information indicative of the configuration of particular resources of the ports and/or input and output interfaces 46, 48 may be stored in one or more databases.

The nodes 30 may include one or more devices that gather, process, store, and/or provide information in a manner described herein. For example, the nodes 30 may include one or more optical data processing and/or traffic transfer devices, such as an optical node, an optical add-drop multiplexer ("OADM"), a reconfigurable optical add-drop multiplexer ("ROADM"), an optical multiplexer, an optical demultiplexer, an optical transmitter, and optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic. In some implementations, the nodes 30 may include OADMs and/or ROADMs capable of being configured to add, drop, multiplex, and demultiplex optical signals. The nodes may process and transmit optical signals to other nodes 30 throughout the data transport network 14 in order to deliver optical transmissions.

Returning now to FIG. 1, the controller 12 utilizes the communication links 32 to communicate with the nodes 30 to configure the physical ports 44 of the nodes 30. The controller 12 may communicate messages directly with the nodes 30. In one embodiment, the controller 12 may transmit signals to the nodes 30 containing messages conforming with OpenFlow protocol to configure the physical ports 44. Additionally or alternatively, one or more of the nodes 30 may act as a proxy for other nodes 30. For example, the first node 30a may act as a proxy for the second, third, and fourth nodes 30b, 30cc 30d. In this instance, a message intended for second node 30b would be delivered by the controller 12 to the first node 30a, which would forward the message to the second node 30b.

As shown in FIG. 1, the data transport network 14 may be used for communicating data between the customer computer devices 16. The customer computer devices may be part of a customer data center, for example. The customer computer devices 16 may be connected to the data transport network 14 with the communication links 32. The customer computer devices 16 may be interconnected through the data transport network 14 using point-to-point (P2P) and multi-point-to-multipoint (MP2MP) Layer 2 Ethernet services, such as Metro Ethernet Forum (MEF)-defined Ethernet Line (E-Line) and Ethernet local area networks (E-LAN). For example, the nodes 30 and communication links 32 may be organized into one or more Ethernet local area networks (E-LANs). For explanatory purposes, the illustrated data transport network 14 of FIG. 1 comprises a first customer computer device 16a, a second customer computer device 16b, a third customer computer device 16c, and a fourth customer computer device 16d communicating through the data transport network 14, shown in this example as an E-LAN.

The nodes 30 and the communication links 32 may be logically organized into one or more Ethernet Virtual Local Area Network (VLANs). The Ethernet Virtual Local Area Network (VLAN) is a group of network devices on one or more Local Area Network (LAN) that are configured to communicate as if they are in the same physical location, when, in fact, the devices are located on two or more different LAN segments. A VLAN can be considered an independent logical network within one or more physical networks. Virtual Local Area Networks (VLANs) operate at layer 2 of the OSI Model. The VLAN allows a single individual physical port 44 on a network device, such as the nodes 30, to be used for multiple customers.

VLAN Tagging is the practice of inserting VLAN identification information into a data header of a data packet in order to identify to which VLAN the data packet belongs. The VLAN identification information may be referred to as a VLAN tag. The nodes 30 in the data transport network 14 use the VLAN identification information to determine to which VLAN the data packets belong, as well as information about the VLAN and the endpoint node port(s) 44 to which to send the data packet. The ports 44 of different endpoint nodes 30 may use different bridging technologies, such as bridging technologies conforming to IEEE 802.1Q standard or IEEE 802.1ad standard.

Figure 4:
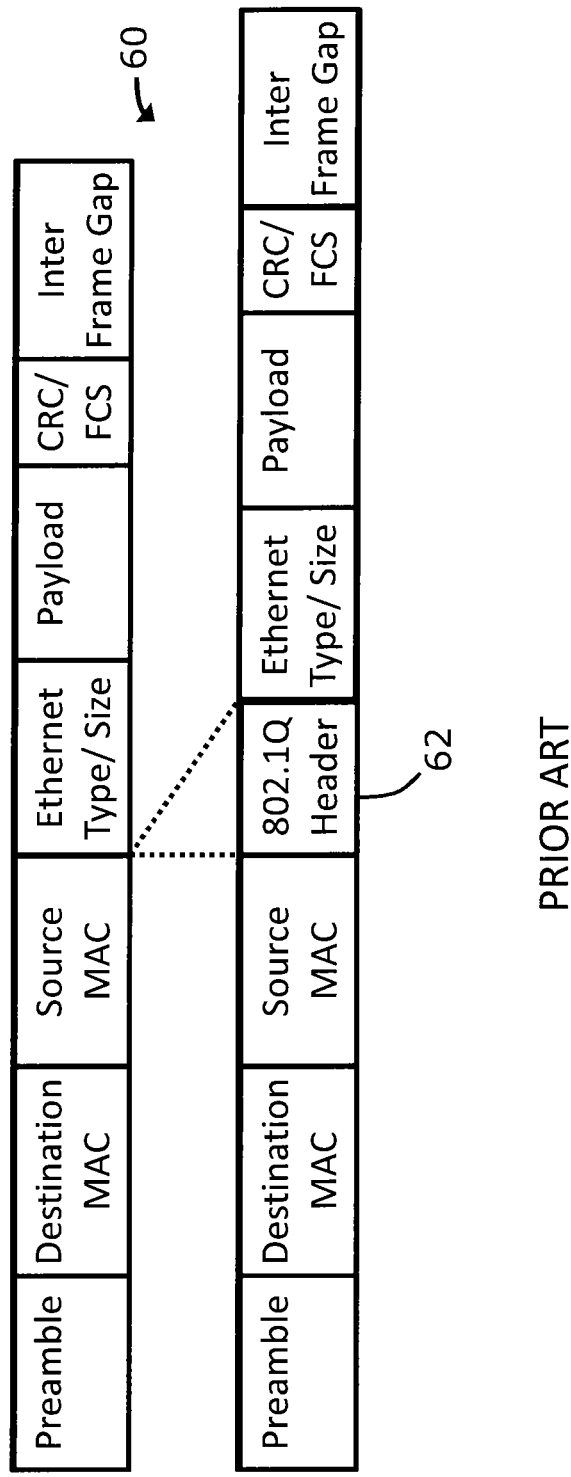
FIG. 4 is a schematic diagram of an exemplary Ethernet data packet frame.

FIG. 4 illustrates an exemplary 802.1Q frame 60 for an Ethernet data packet conforming to the IEEE 802.1Q standard. The 802.1Q frame 60 allows for the use of a 802.1Q header having a first VLAN tag 62. The first VLAN tag may be referred to as a "customer" VLAN tag, or a C-VLAN tag, or simply a C-tag. When only the first VLAN tag 62 is used, the first VLAN tag 62 may be considered the "outer" VLAN tag. The first VLAN tag 62 may be utilized to carry information identifying the VLAN used for the data packet, such as customer information for the VLAN used for the data packet. One or more nodes 30 in the data transport network 14 may be configured to conform to the IEEE 802.1Q standard.

Figure 5:
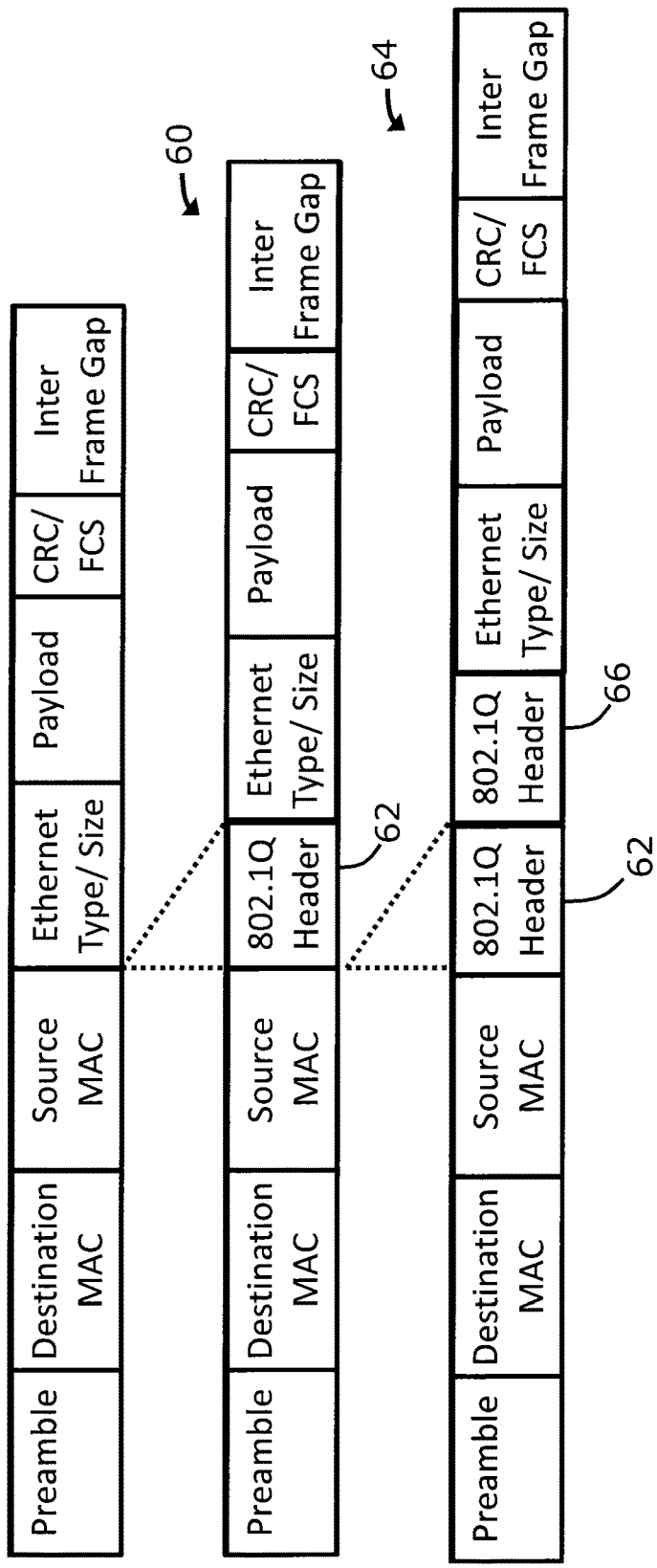
FIG. 5 is a schematic diagram of another exemplary Ethernet data packet frame.

FIG. 5 illustrates an exemplary IEEE 802.1ad frame 64 for an Ethernet data packet conforming to the IEEE 802.1ad standard. The IEEE 802.1ad frame 64 allows for the use of a 802.1ad header having the first VLAN tag 62 and a second VLAN tag 66. The second VLAN tag 66 may be referred to as a "service provider" VLAN tag, or a S-VLAN tag, or simply a S-tag. When both the first VLAN tag 62 and the second VLAN tag 66 are utilized, the second VLAN tag 66 (that is, the S-tag) is considered the "outer" VLAN tag and the first VLAN tag 62 (that is, the C-tag) is considered the "inner" VLAN tag. The second VLAN tag 66 may be utilized to carry information identifying the VLAN used for the data packet, such as service provider information for the VLAN used for the data packet. One or more nodes 30 in the data transport network 14 may be configured to conform to the IEEE 802.1ad standard.

Bridging technologies and data packet frames are further described in the IEEE 802.1Q and IEEE 802.1ad standards.

Individual VLANs may use differing identification information for the same client or service provider. When a network operator configures a path through the data transport network 14, such as an E-LAN, or between two or more networks, the network operator configures the ports 44 of each endpoint node 30 to switch or maintain or strip the VLAN information based on the individual network upon ingress to, and egress from, the data transport network 14, such that the first and/or second VLAN tags 62, 66 remain consistent within the individual data transport network 14.

Figure 6:
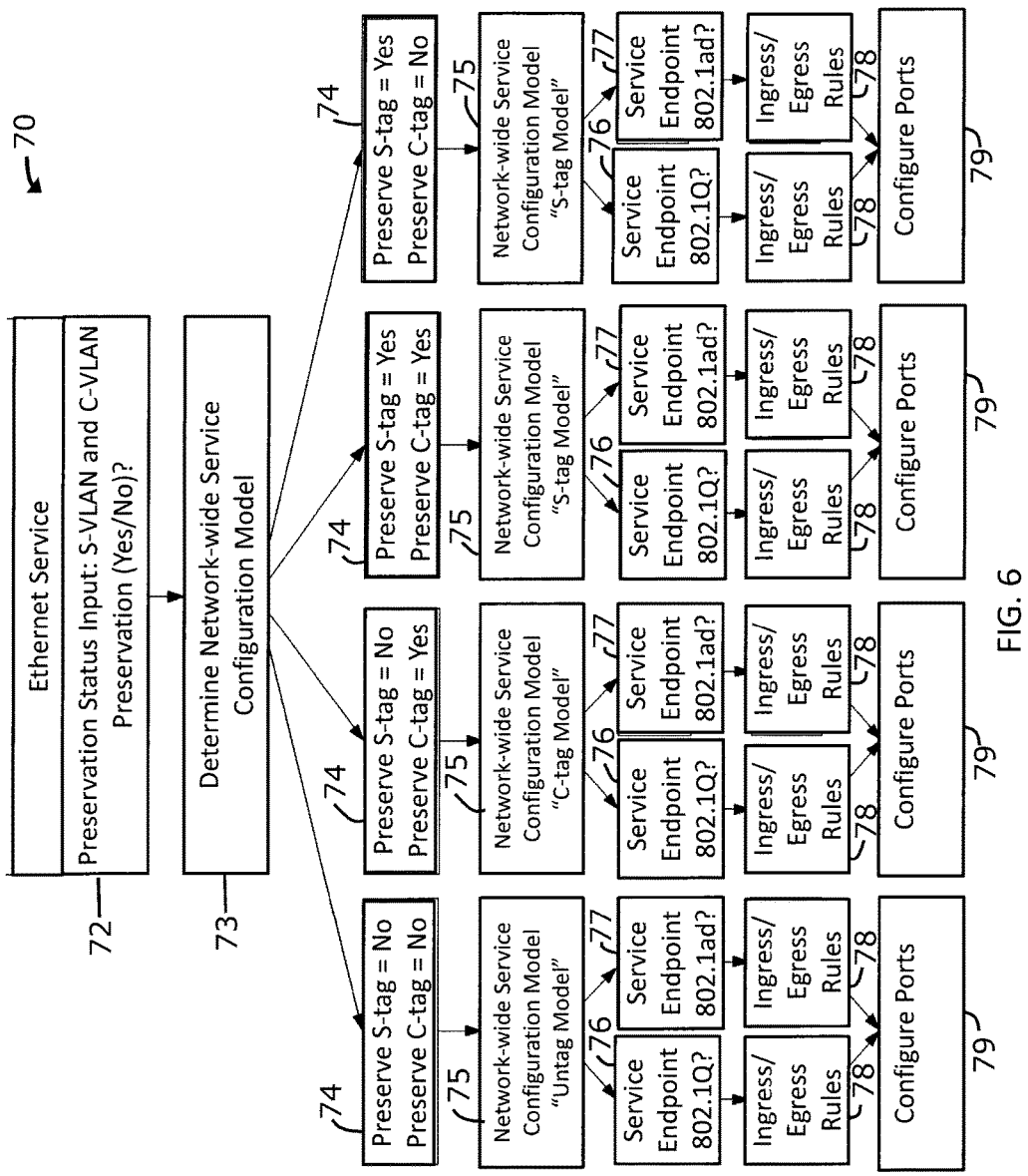
FIG. 6 is a flow diagram of an exemplary process flow in accordance with the present disclosure.

Referring now to FIG. 6, an exemplary automated network-wide service configuration method 70 in accordance with the present disclosure will be described. The examples are shown in conjunction with Ethernet service deployments for data center interconnect applications. However, it will be understood that the methods in accordance with the present disclosure may be used in other data transport network applications, non-exclusive examples of which include Ethernet service deployments across Metro Ethernet Networks, Wide Area Networks (WAN), and/or Metro Ethernet Forum (MEF)-defined Ethernet Lines.

As illustrated in FIG. 6, an exemplary process flow of the method 70 may comprise receiving with the controller 12, for an Ethernet service, a preservation status input 72 from a user. The preservation status is indicative of whether or not the port 44 of the node 30 should preserve the first and/or second virtual local area network (VLAN) tag 62, 66 (that is, the C-tag and/or the S-tag) in the header of a data packet transmitted into and/or out of the data transport network 14, such as an Ethernet local area network (E-LAN). In one embodiment, the controller 12 may prompt the user for the preservation status input 72 and/or for other information.

As shown in element 73, the controller 12 determines a scalable network-wide service configuration model having multiple predetermined rules for automatically configuring the physical ports 44 of the endpoint nodes 30 for the E-LAN based on the preservation status input 72 from the user, as shown in element 74. In one embodiment, four configuration model types may be determined, such as the configuration model types shown in element 75 of FIG. 6.

In one embodiment, the controller 12 may determine, or be provided with, bridging information indicative of bridging technology of the ports 44 to be configured, such as whether the ports 44 are configured to conform with the IEEE 802.1Q standard or the IEEE 802.1ad standard. The controller 12 may utilize the bridging information along with the preservation status input 72 to determine the predetermined rules of the configuration model, as shown in elements 76 and 77 of FIG. 6.

In one embodiment, as illustrated in element 76 of FIG. 6, the controller 12 determines that a port 44 of one or more node 30 is configured to conform to the IEEE 802.1Q standard. In such a case, the port 44 has the capability to edit or maintain the outer VLAN tag only, whether the outer VLAN tag is the first VLAN tag 62 (i.e., the C-tag) or the second VLAN tag 66 (i.e., the S-tag). The controller 12 therefore determines the predetermined rules for the port 44 based in part on the capabilities of the port 44 for a single VLAN tag, that is, the outer VLAN tag, which may be the first VLAN tag 62 or the second VLAN tag 66 depending on the incoming data packet header.

In one embodiment, as illustrated in element 77 of FIG. 6, the controller 12 determines that a port 44 of one or more node 30 is configured to conform to the IEEE 802.1ad standard. In such a case, the port 44 has the capability to edit or maintain both the inner and the outer VLAN tags, that is, the first and the second VLAN tags 62, 66. The controller 12 therefore determines the predetermined rules for the port 44 based in part on the capabilities of the port 44 for utilizing both the inner and outer VLAN tags, that is, the first and the second VLAN tags 62, 66.

The controller 12 determines the rules for the configuration models, as illustrated in element 78 of FIG. 6. The predetermined rules of the network-wide service configuration model may comprise one or more ingress VLAN edit operation and/or one or more egress VLAN edit operation. That is, the predetermined rules may comprise rules for the ports 44 of the nodes 30 to follow to edit or maintain the first and/or the second VLAN tag 62, 66 when the data packet enters the data transport network 14; and rules for the ports 44 of the nodes 30 to follow to edit or maintain the first and/or second VLAN tag 62, 66 when the data packet leaves the data transport network 14. For example, the predetermined rules may comprise rules to "push" (add), "pop" (delete), and or "swap" (exchange) the first and/or second VLAN tag 62, 66. The predetermined rules may comprise rules not to edit (that is, to maintain) the first and/or second VLAN tag 62, 66.

The actions at ingress of the data packet into the data transport network 14, from a particular customer computer device 16, are reversed upon egress of the data packet out of the data transport network 14 to the particular customer computer device 16, such that the first and second VLAN tags 62, 66 remain consistent for the particular customer computer device 16 or connected network (not shown).

In one embodiment, the preservation status input 72 comprises two preservation status orders chosen from a group consisting of: preserving the service provider VLAN tags 66, preserving the customer VLAN tags 62, not preserving the service provider VLAN tags 66, not preserving the customer VLAN tags 62. In one embodiment, preserving the customer VLAN tags 62 may include maintaining an empty status of the customer VLAN tags 62. In one embodiment, preserving the service provider VLAN tags 66 may include maintaining an empty status of the service provider VLAN tags 66.

In one embodiment, the predetermined rules are chosen from a group of actions consisting of: editing the customer and service provider VLAN tags 62, 66 for data packets coming into the data transport network 14 (such as an E-LAN); preserving the customer and service provider VLAN tags 62, 66 for data packets coming into the data transport network 14; editing the customer VLAN tags 62 but preserving service provider VLAN tags 66 for data packets coming into the data transport network 14; editing the service provider VLAN tags 66 but preserving customer VLAN tags 62 for data packets coming into the data transport network 14; and maintaining an empty status of the customer and service provider VLAN tags 62, 66. In one embodiment, editing the customer and/or service provider VLAN tags 62, 66 for data packets coming into the data transport network 14 further comprises removing, adding, and/or exchanging the information in the customer and/or the service provider VLAN tags 62, 66 for new information indicative of VLAN identification particular to the data transport network 14 which the data packet is entering.

In one embodiment, the chosen actions for the predetermined rules are reversed upon egress of the data packet from the data transport network 14 (such as an E-LAN), such that the predetermined rules are further chosen from a group of actions consisting of: editing the customer and service provider VLAN tags 62, 66 for data packets exiting the data transport network 14; preserving the customer and service provider VLAN tags 62, 66 for data packets exiting the data transport network 14; editing the customer VLAN tags 62 but preserving the service provider VLAN tags 66 for data packets exiting the data transport network 14; editing the service provider VLAN tags 66 but preserving the customer VLAN tags 62 for data packets exiting the data transport network 14; and maintaining an empty status of the customer and service provider VLAN tags 62, 66 exiting the data transport network 14. In one embodiment, editing the customer and/or service provider VLAN tags 62, 66 for data packets exiting the data transport network 14 further comprises removing, adding, and/or exchanging the information in the customer and/or service provider VLAN tags 62, 66 for new information indicative of VLAN identification particular to the external network or customer computer device 16 which the data packet is entering.

Once the rules are determined for the configuration model, the controller 12 configures the physical ports 44 of the nodes 30 using the predetermined rules of the network-wide service configuration model, as illustrated in element 78 of FIG. 6. The physical ports 44 of the nodes 30 are configured to follow the predetermined rules of the configuration model as to how to edit or maintain the first and/or second VLAN tags 62, 66 when the data packet enters or leaves the data transport network 14. The ports 44 may identify data frames matching the predetermined rules and perform one or more operations based on the predetermined rules.

The controller 12 may communicate with the control module 40 of the node 30 to configure the port 44 of the node 30 according to the predetermined rules. The controller 12 may transmit one or more signal to the node 30 to configure the port 44. The signal may contain one or more message having the configuration information. The message may conform with the OpenFlow protocol message format.

The network-wide service configuration model is scalable in that the model is determined and applied in substantially the same manner for any size data transport network 14 and for any number of ingress nodes 30 and/or egress nodes 30 and/or ports 44. This scalability enhances the operation of the data transport network 14. The controller 12 views the data transport network 14 as a whole and configures the ports 44 of the nodes 30 consistently across the data transport network 14 based on the predetermined rules.

Figure 7:
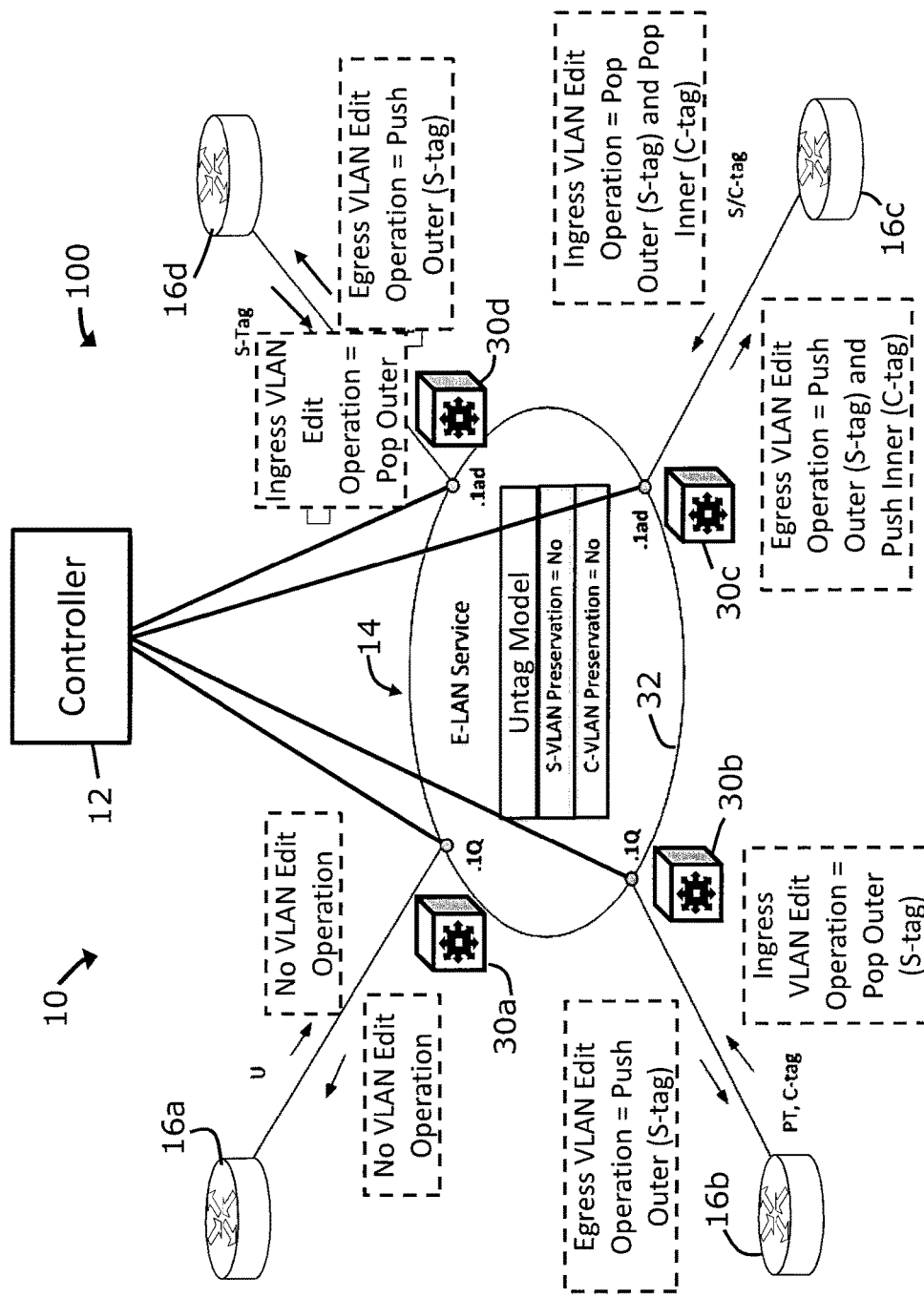
FIG. 7 is a schematic diagram of an exemplary network-wide service configuration system in use in the exemplary data transport network of FIG. 1 in accordance with the present disclosure.

FIG. 7 illustrates a first example 100 of the automatic network-wide configuration system 10 of FIG. 1 in which the received preservation status input 72 is indicative of not preserving the first and second VLAN tags (that is, the C-tag and/or the S-tag) in the header of a data packet transmitted within the data transport network 14, such as an Ethernet local area network (E-LAN). The controller 12 determines the network-wide service configuration model to include predetermined rules for not preserving the first and the second VLAN tags 62, 66, which will be referred to for purposes of this example as an "Untag model".

The controller 12 determines that the first node 30a and the second node 30b are configured to conform with the IEEE 802.1Q standard and that the third node 30c and the fourth node 30d are configured to conform with the IEEE 802.1ad standard.

The controller 12 determines rules for the configuration of the ports 44 of the first node 30a and the second node 30b. The controller 12 further determines rules for the configuration of the ports 44 of the third node 30c and the fourth node 30d. The controller 12 configures the ports 44 of the first, second, third, and fourth nodes 30a, 30b, 30c, 30d conforming to the predetermined rules of the Untag model.

In the example illustrated in FIG. 7, the first customer computer device 16a transmits data packets that do not have information in the first or the second VLAN tags 62, 66. At ingress of the data packet to the first node 30a, based on the configuration carried out with the predetermined rules, the port 44 of the first node 30a performs no VLAN edit operation, thereby leaving the data packet without VLAN tag information (that is, untagged). Likewise, at egress of data packets from the data transport network 14 to the first customer computer device 16a, the port 44 of the first node 30a performs no VLAN edit operation, since the data packets leaving the data transport network 14 will have no information in the first or the second VLAN tags 62, 66, as will be shown in the description of the other ports in the data transport network 14.

In FIG. 7, the second customer computer device 16b is transmitting a data packet that has a priority tagged Ethernet frame with information in the first VLAN tag 62 (that is, the C-tag). A priority tagged Ethernet frame enables a 802.1Q Ethernet frame to be transmitted with the VLAN tags set at a value from zero to seven. The priority tagged Ethernet frame may be processed according to the priority value configured in the 802.1P bits of the 802.1Q Ethernet frame header. Setting the VLAN tags to zero allows the VLAN tags to be ignored and the Ethernet frame to be processed according to the priority configured in the 802.1 P bits of the 802.1Q Ethernet frame header. At ingress of the data packet to the second node 30b, based on the configuration carried out with the predetermined rules, the port 44 of the second node 30b pops (deletes) the outer VLAN tag, which in this case is the first VLAN tag 62 (that is, the C-tag), since the second node 30b is configured to conform with the IEEE 802.1Q standard. Likewise, at egress of data packets to the second customer computer device 16b, the port 44 of the second node 30b pushes (adds) the outer VLAN tag, which is the first VLAN tag 62 (the C-tag) back to the out-going data packets based on the receiving customer computer device.

In FIG. 7, the third customer computer device 16c transmits data packets that have a data frame with information in the first VLAN tag 62 (that is, the C-tag) and the second VLAN tag 66 (that is, the S-tag). At ingress of the data packet to the third node 30c, based on the configuration carried out with the predetermined rules, the port 44 of the third node 30c pops (deletes) the inner and the outer VLAN tag, that is, the first and second VLAN tag 62, 66 (the C-tag and the S-tag), since the third node 30c is configured to conform with the IEEE 802.1ad standard. Likewise, at egress of data packets to the third customer computer device 16c, the port 44 of the third node 30c pushes (adds) the inner and the outer VLAN tag, that is, the first and second VLAN tag 62, 66 (the C-tag and the S-tag) to the out-going data packets.

In FIG. 7, the fourth customer computer device 16d transmits data packets that have a data frame with information in the second VLAN tag 66 (the S-tag) but no information in the first VLAN tag 62 (the C-tag). At ingress of the data packet to the fourth node 30d, based on the configuration carried out with the predetermined rules, the port 44 of the fourth node 30d pops (deletes) the outer VLAN tag, that is, the second VLAN tag 66 (the S-tag), since the fourth node 30d is configured to conform with the IEEE 802.1ad standard. Since there is no C-tag information, no edit operation is performed for the first VLAN tag 62. Likewise, at egress of data packets to the fourth customer device, the port of the fourth node pushes (adds) back to the data packet the outer VLAN tag, that is, second VLAN tag (the C-S-tag).

Figure 8:
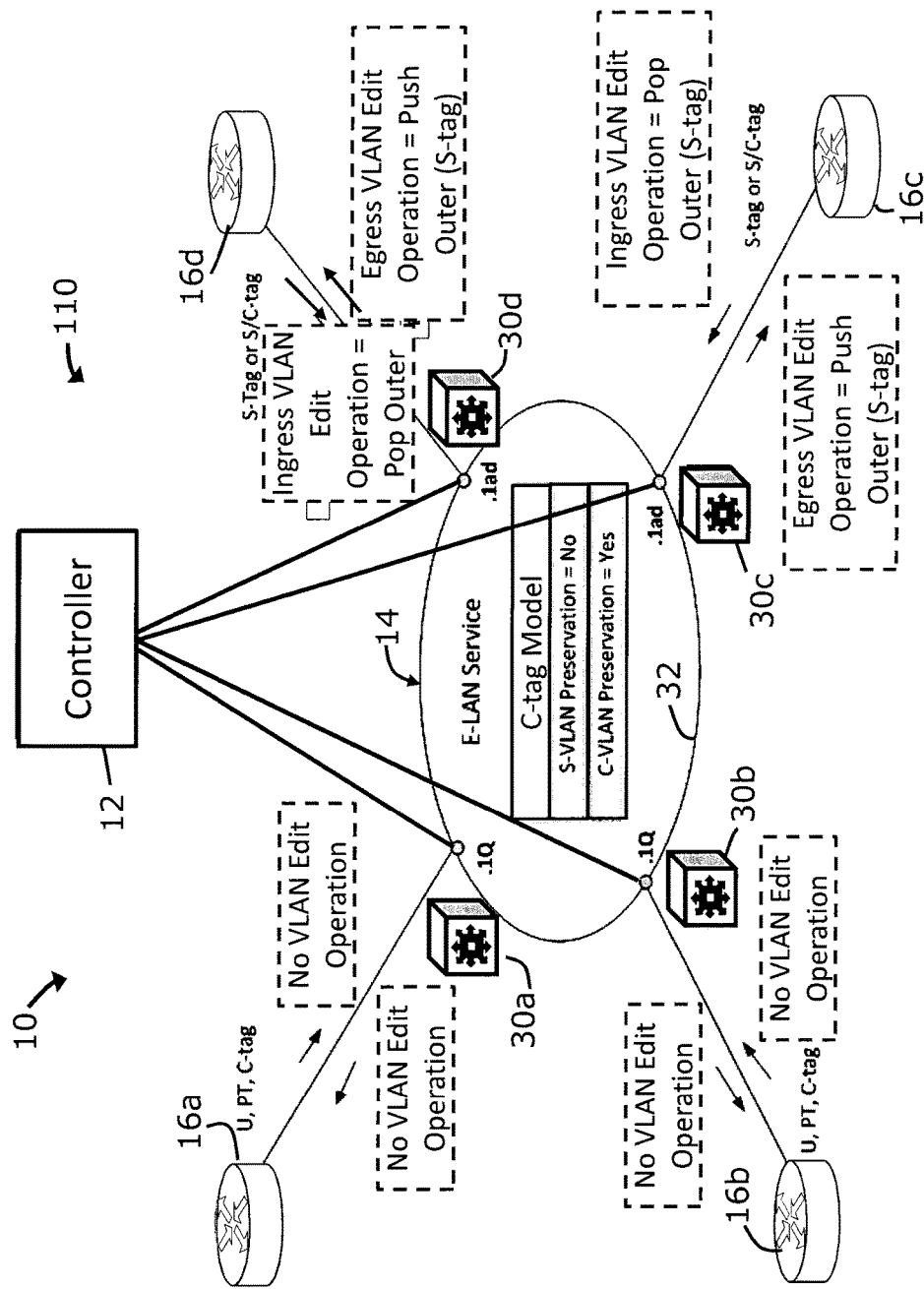
FIG. 8 is a schematic diagram of another exemplary automatic network-wide service configuration system in use in the exemplary data transport network of FIG. 1 in accordance with the present disclosure.

FIG. 8 illustrates a second example 110 of the automatic network-wide configuration system of FIG. 1 in which the received preservation status input 72 is indicative of not preserving the second VLAN tag (that is, the S-tag) but preserving the first VLAN tag (that is, the C-tag) in the header of a data packet transmitted within the data transport network 14, such as an Ethernet local area network (E-LAN). The controller 12 determines the network-wide service configuration model to include predetermined rules for not preserving the second VLAN tag and preserving the first VLAN tag, which will be referred to for purposes of this example as a "C-tag model".

The controller 12 determines that the first node 30a and the second node 30b are configured to conform with the IEEE 802.1Q standard and that the third node 30c and the fourth node 30d are configured to conform with the IEEE 802.1ad standard.

The controller 12 determines rules for the configuration of the ports 44 of the first node 30a and the second node 30. The controller 12 further determines rules for the configuration of the ports 44 of the third node 30c and the fourth node 30d. The controller 12 configures the ports 44 of the first, second, third, and fourth nodes 30a, 30b, 30c, 30d following the predetermined rules of the C-tag model.

In the example 110 illustrated in FIG. 8, the first customer computer device 16a is transmitting a data packet that has a priority tagged Ethernet frame and that does not have information in the second VLAN tag 66 (that is, the S-tag) but does have information in the first VLAN tag 62 (that is, the C-tag). At ingress of the data packet to the first node 30a, based on the configuration carried out with the predetermined rules, the port 44 of the first node 30a performs no VLAN edit operation, since the C-tag model rules dictate preservation of the first VLAN tag 62 (that is, the C-tag) and since the port conforms to the IEEE 802.1Q standard. Likewise, at egress of data packets to the first customer computer device 16a, the port 44 of the first node 30a performs no VLAN edit operation, since the data packets leaving the data transport network 14 will contain C-tag information and the port 44 conforms to the IEEE 802.1Q standard.

In FIG. 8, the second customer computer device 16b is transmitting a data packet that has a priority tagged Ethernet frame with information in the first VLAN tag 62 (the C-tag) but no information in the second VLAN tag 66 (the S-tag). At ingress of the data packet to the second node 30b, based on the configuration carried out with the predetermined rules, the port 44 of the second node 30b performs no VLAN edit operation, since the second node 30b is configured to conform with the IEEE 802.1Q standard. Likewise, at egress of data packets to the second customer computer device 16b, the port 44 of the second node 30b performs no VLAN edit operation, since the data packets leaving the data transport network 14 will contain C-tag information, and the port 44 conforms to the IEEE 802.1Q standard.

In FIG. 8, the third customer computer device 16c and the fourth customer computer device 16d are transmitting data packets that have a data frame with information in the first VLAN tag 62 (the C-tag) and the second VLAN tag 66 (the S-tag). At ingress of the data packets to the third node 30c and the fourth node 30d, based on the configuration carried out with the predetermined rules, the ports 44 of the third node 30c and the fourth node 30d pop (delete) the outer VLAN tag, that is, the second VLAN tag 66 (the S-tag). Likewise, at egress of data packets to the third customer computer device 16c and the fourth customer computer device 16d, the ports 44 of the third node 30c and the fourth node 30d push (add) back the outer VLAN tag, that is, the second VLAN tag 66 (the S-tag) to the data packet.

Figure 9:
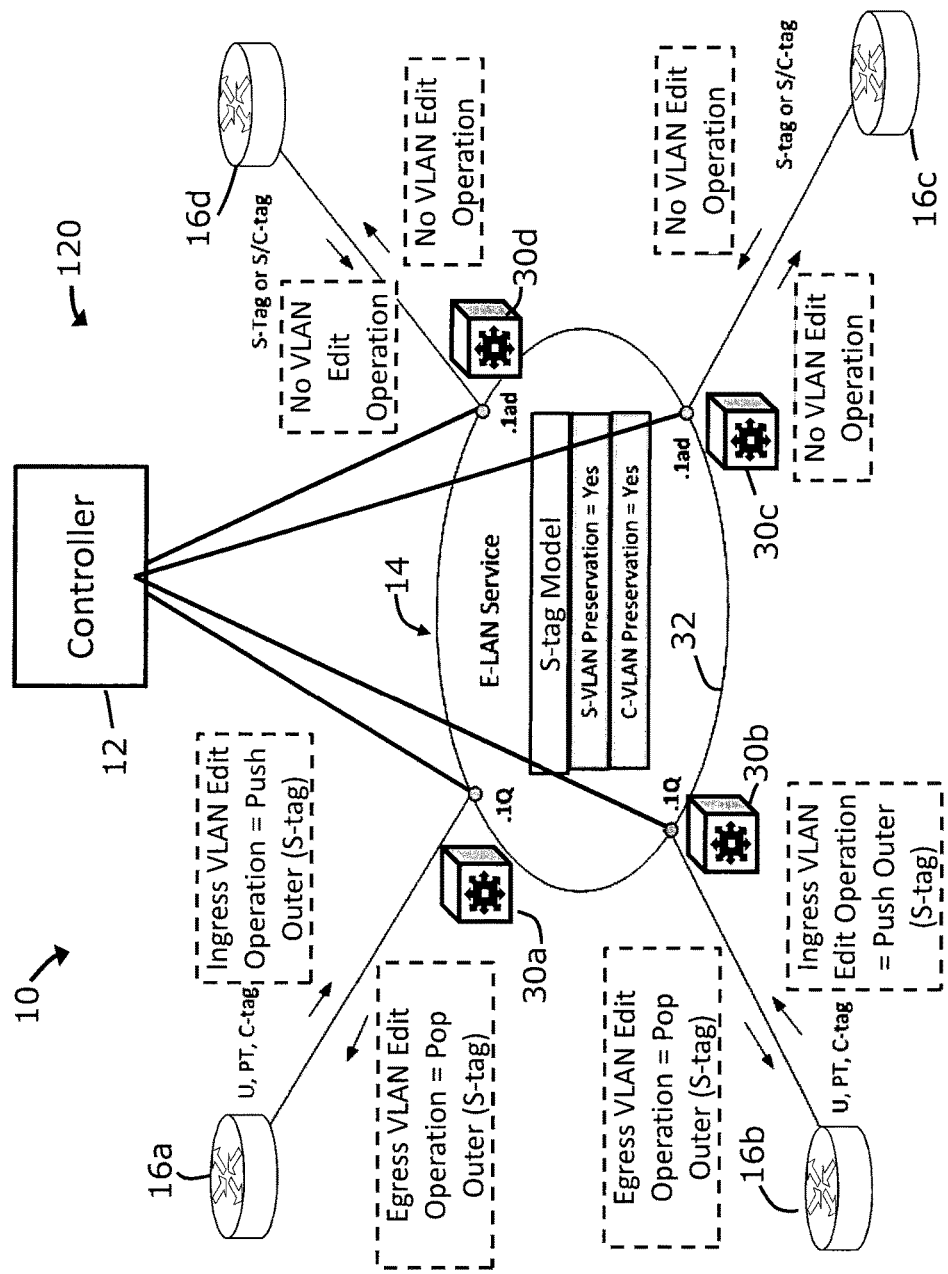
FIG. 9 is a schematic diagram of yet another exemplary automatic network-wide service configuration system in use in the exemplary data transport network of FIG. 1 in accordance with the present disclosure.

FIG. 9 illustrates a third example 120 of the automatic network-wide configuration system of FIG. 1 in which the received preservation status input 72 is indicative of preserving the second VLAN tag 66 (that is, the S-tag) and the first VLAN tag 62 (that is, the C-tag) in the header of a data packet transmitted within the data transport network 14, such as an Ethernet local area network (E-LAN). The controller 12 determines the network-wide service configuration model to include predetermined rules for not preserving the second VLAN tag 66 and preserving the first VLAN tag 62, which will be referred to for purposes of this example as a "S-tag model".

The controller 12 determines that the first node 30a and the second node 30b are configured to conform with the IEEE 802.1Q standard and that the third node 30c and the fourth node 30d are configured to conform with the IEEE 802.1ad standard.

The controller 12 determines rules for the configuration of the ports 44 of the first node 30a and the second node 30b. The controller 12 further determines rules for the configuration of the ports 44 of the third node 30c and the fourth node 30d. The controller 12 configures the ports 44 of the first, second, third, and fourth nodes 30a, 30b, 30c, 30d following the predetermined rules of the S-tag model.

In the example 120 illustrated in FIG. 9, the first customer computer device 16a and the second customer computer device 16b are transmitting data packets that have priority tagged Ethernet frames and that do not have information in the second VLAN tags 66 (that is, the S-tags) but do have information in the first VLAN tags 62 (that is, the C-tags). At ingress of the data packets to the first node 30a and the second node 30b, based on the configuration carried out with the predetermined rules, the ports 44 of the first node 30a and the second node 30b push (add) the outer tag (that is, the second VLAN tag 66, the S-tag) and, following the predetermined rules, the first VLAN tag 62 (the C-tag is) not edited (i.e. the C-tag is preserved). The port 44 performs no operation on the first VLAN tag 62 (the C-tag) at ingress. Similarly, if the port 44 receives a frame with the second VLAN tag 66 (i.e. the S-tag, the outer tag) and the first VLAN tag 62 (i.e. the C-tag, the inner tag), both the first and the second VLAN tags 62, 66 will be preserved. However, if the data frame is received with a single VLAN tag, for example, received with the first VLAN tag 62 (the C-tag), in the ingress direction, the second VLAN tag 66 (the S-tag) will be pushed (added) to the data frame.

Likewise, in the example 120, at egress of data packets to the first customer computer device 16a and the second customer computer device 16b, the ports 44 of the first node 30a and the second node 30b pop (delete) the information in the outer tags (that is, the second VLAN tags 66, the S-tags). At egress, the ports 44 of the first node 30a and the second node 30b will maintain the first VLAN tag 62 (the C-tag) and the data packets with the C-tags will be transmitted to the first and second customer computer devices 16a, 16b.

In FIG. 9, the third customer computer device 16c and the fourth customer computer device 16d are transmitting data packets that have data frames with information in the first VLAN tag 62 (the C-tag) and the second VLAN tag 66 (the S-tag). At ingress of the data packets to the third node 30c and the fourth node 30d, based on the configuration carried out with the predetermined rules, the ports 44 of the third node 30c and the fourth node 30d make no VLAN edit operation, since the third node 30c and the fourth node 30d are configured to conform with the IEEE 802.1ad standard and since the first and second VLAN tags 62, 66 are to be preserved.

Likewise, at egress of data packets to the third customer computer device 16c and the fourth customer computer device 16d, the ports 44 of the third node 30c and the fourth node 30d make no VLAN edit operation, since the data packets in the data transport network 14 already contain first and second VLAN tag 62, 66 information (that is C-tag and S-tag information).

Figure 10:
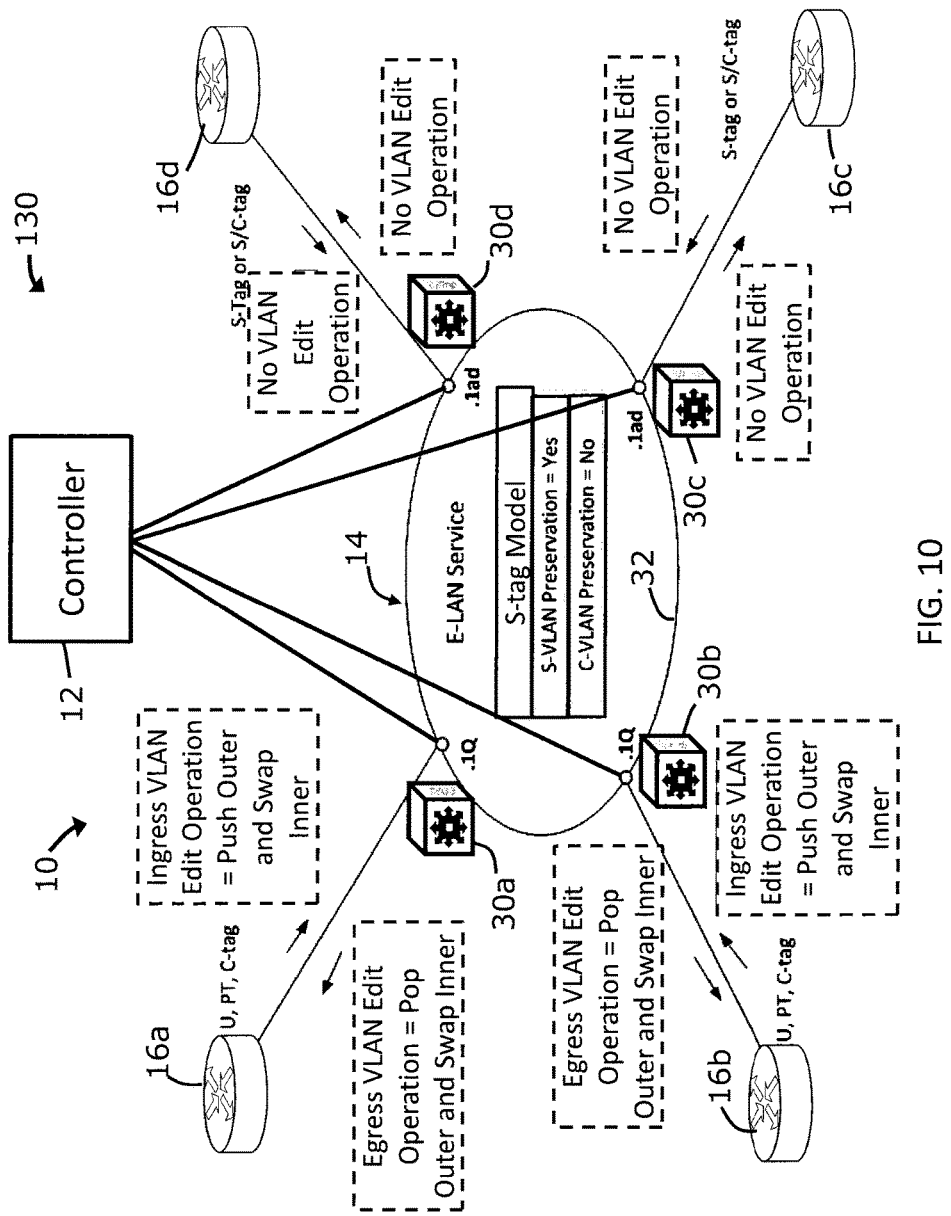
FIG. 10 is a schematic diagram of still another exemplary automatic network-wide service configuration system in use in the exemplary data transport network of FIG. 1 in accordance with the present disclosure.

FIG. 10 illustrates a fourth example 130 of the automatic network-wide configuration system 10 of FIG. 1 in which the received preservation status input is indicative of preserving the second VLAN tag 66 (that is, the S-tag, also known as the outer tag) and not preserving the first VLAN tag 62 (that is, the C-tag, also known as the inner tag) in the header of a data packet transmitted within the data transport network 14, such as an Ethernet local area network (E-LAN). The controller 12 determines the network-wide service configuration model to include predetermined rules for not preserving the second VLAN tag 66 and preserving the first VLAN tag 62, which will be referred to for purposes of this example as a "S-tag model". The preservation status input in the fourth example 130 results in the same S-tag model as the third example 120 since preserving the S-tag results in the same actions at the ports 44 for the ingress and the egress of the data packets whether or not the C-tag is preserved, as the C-tag may not be used by the data transport network 14.

The number of devices and/or networks illustrated herein is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices may perform one or more functions described as being performed by another one or more of the devices. Devices may interconnect via wired connections, wireless connections, or a combination of wired and wireless connections.

Of course, it will be understood that the implementations of the system that are described herein are merely for explanatory purposes and that other variations may be implemented for other data transport network types or organizations.

Conclusion

Conventionally, when a network operator configures a path through a network, such as a LAN, or between two or more networks, the network operator must configure the ports 44 of each endpoint network device 30 to switch or maintain or strip the VLAN information based on the individual network upon ingress to, and egress from, the network. Currently, the process of configuring the endpoint network devices 30 is carried out manually. The current process is time consuming and error prone. An error in the configurations of the ports 44 may result in delay, or failure, of data traffic delivery and/or loss of connectivity to network devices 30. As data transport networks grow in size, manual configuration is unable to meet the demands for timeliness of responses to client requirement changes and quality of service.

In accordance with the present disclosure, methods and systems are described which improve the function and performance of computer networks through network-wide service configuration models and solve the described, and other, technological problems. For example, the implementation of the network-wide service configuration system and method configures the ports 44 of the nodes 30 accurately and consistently across the data transport network 14, thereby increasing the data transfer and reliability of the data transport network 14.

Rather than the operator configuring the endpoint network devices, the operator provides a series of inputs to the controller 12 including a preservation status input 72 indicative of whether or not to preserve a virtual local area network (VLAN) tag in a header of a data packet transmitted within an Ethernet local area network (E-LAN). The controller 12 then determines a scalable network-wide service configuration model having multiple predetermined rules for automatically configuring the physical ports 44 of the network devices for the E-LAN based on the preservation status input from the user, and automatically configures the physical ports 44 of the network devices 30 using the predetermined rules of the configuration model. The configuring can be accomplished by generating and transmitting signals (optical or electrical) including information that directs the network devices 30 to set the ports 44 in a manner that conform to rules set forth in the Institute of Electrical and Electronics Engineers (IEEE) standard identified as 802.1Q or 802.1ad.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network. It should be understood that the methods described herein may be applied to any protection or protection scenario for any mesh network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

RFC 2328, "OSPF Version 2," Moy, J., The Internet Society, Apr. 1998.

G.709-v3 ITU-T, "Interfaces for the Optical Transport Network (OTN)", G.709 Recommendation, Dec. 2009.

802.1Q-2014—Bridges and Bridged Networks, IEEE Standard, Dec. 19, 2014.

G.805 ITU-T, Recommendation, "Generic functional architecture of transport networks", Mar. 2000.

G.872 ITU-T, "Architecture of optical transport networks", Nov. 2001.

X.200 ITU-T, "Information technology—Open Systems Interconnection—Basic Reference Model: The basic model," Jul. 1994.

What is claimed is:

1. A method, comprising:

receiving, with a computer processor of a controller via an input device communicating with the computer processor, a preservation status input from a user indicative of whether or not to preserve a virtual local area network (VLAN) tag in a header of a data packet transmitted within an Ethernet local area network (E-LAN), the VLAN tag identifying at least one of customer information and service provider information for the data packet in the E-LAN, wherein the E-LAN comprises network devices having physical ports interconnected with communication links, and wherein the E-LAN is configured to allow multiple customers use of an individual physical port;

determining, with the computer processor of the controller, a scalable network-wide service configuration model having multiple predetermined rules for automatically configuring the physical ports of the network devices for the E-LAN based on the preservation status input from the user; and transmitting a series of signals by the computer processor via an output device communicating with the computer processor to configure automatically, with the controller, the physical ports of the network devices using the predetermined rules of the configuration model, wherein the predetermined rules are chosen from a group of actions consisting of:

editing customer and service provider VLAN tags for data packets coming into the E-LAN; preserving customer and service provider VLAN tags for data packets coming into the E-LAN; editing customer VLAN tags but preserving service provider VLAN tags for data packets coming into the E-LAN; editing service provider VLAN tags but preserving customer VLAN tags for data packets coming into the E-LAN; and maintaining an empty status of the VLAN tags, wherein the chosen actions for the predetermined rules include predetermined rules for the reversal of the actions upon egress of the data packet from the E-LAN.

2. The method of claim 1, wherein the physical ports include a first physical port configured to read a single VLAN tag.

3. The method of claim 2, wherein the physical ports include a first physical port configured to conform to rules set forth in the Institute of Electrical and Electronics Engineers (IEEE) standard identified as 802.1Q.

4. The method of claim 1, wherein the physical ports include a first physical port configured to read multiple VLAN tags.

5. The method of claim 4, wherein the physical ports include a first physical port configured to conform to rules set forth in the Institute of Electrical and Electronics Engineers (IEEE) standard identified as IEEE 802.1ad.

6. The method of claim 1, wherein the VLAN tag comprises a customer VLAN tag and/or a service provider VLAN tag, and wherein the preservation status input comprises two preservation status orders chosen from a group consisting of: preserving the service provider VLAN tag, preserving the customer VLAN tag, not preserving the service provider VLAN tag, and not preserving the customer VLAN tag.

7. The method of claim 1, wherein at least one of the physical ports is an ingress port and the step of configuring automatically, with the controller, the physical ports of the network devices using the predetermined rules of the configuration model further comprises configuring the ingress port to edit the VLAN tag to comply with predetermined rules of the configuration model.

8. The method of claim 1, wherein at least one of the physical ports is an egress port and the step of configuring automatically, with the controller, the physical ports of the network devices using the predetermined rules of the configuration model further comprises configuring the egress port to edit the VLAN tag to comply with predetermined rules of the configuration model.

9. The method of claim 1, wherein configuring automatically, with the controller, the physical ports of the network devices using the predetermined rules of the configuration model, further comprises, determining for each physical port whether the physical port is configured to read multiple VLAN tags in the data packet or a single VLAN tag in the data packet.

10. The method of claim 1, wherein configuring automatically, with the controller, the physical ports of the network devices using the predetermined rules of the configuration model, further comprises:

determining that one of the physical ports is configured to read only an outer VLAN tag in the data packet; and configuring the physical port using the predetermined rules of the configuration model for the outer VLAN tag.

11. A system, comprising:

an Ethernet local area network (E-LAN) comprising a plurality of network devices having physical ports interconnected with communication links, wherein the E-LAN is configured to allow multiple customers use of an individual physical port; and a controller having an input device, an output device, and a computer processor, the computer processor receiving a preservation status input from a user via the input device, the preservation status input indicative of whether or not to preserve a virtual local area network (VLAN) tag in a header of a data packet transmitted within the E-LAN, the VLAN tag identifying at least one of customer information and service provider information for the data packet in the E-LAN;

wherein the computer processor of the controller determines a scalable network-wide service configuration model having multiple predetermined rules for automatically configuring the physical ports of the network devices for the E-LAN based on the preservation status input from the user, and automatically transmits a series of signals via the output device, the series of signals having information that upon receipt by network devices configures the physical ports of the network devices using the predetermined rules of the configuration model, wherein the predetermined rules are chosen from a group of actions consisting of: editing customer and service provider VLAN tags for data packets coming into the E-LAN; preserving customer and service provider VLAN tags for data packets coming into the E-LAN; editing customer VLAN tags but preserving service provider VLAN tags for data packets coming into the E-LAN; editing service provider VLAN tags but preserving customer VLAN tags for data packets coming into the E-LAN; and maintaining an empty status of the VLAN tags, wherein the chosen actions for the predetermined rules include predetermined rules for the reversal of the actions upon egress of the data packet from the E-LAN.

12. The system of claim 11, wherein the VLAN tag comprises a customer VLAN tag and/or a service provider VLAN tag, and wherein the preservation status input comprises two preservation status orders chosen from a group consisting of: preserving the service provider VLAN tag, preserving the customer VLAN tag, not preserving the service provider VLAN tag, and not preserving the customer VLAN tag.

13. The system of claim 11, wherein at least one of the physical ports is an ingress port and the controller automatically configures the ingress port to edit the VLAN tag to comply with predetermined rules of the configuration model.

14. The system of claim 11, wherein at least one of the physical ports is an egress port and the controller automatically configures the egress port to edit the VLAN tag to comply with predetermined rules of the configuration model.

15. The system of claim 11, wherein the controller automatically configuring the physical ports includes the controller determining for each physical port whether the physical port is configured to read multiple VLAN tags in the data packet or a single VLAN tag in the data packet.

16. The system of claim 11, wherein the controller automatically configuring the physical ports includes determining that one of the physical ports is configured to read only an outer VLAN tag in the data packet and configuring the physical port using the predetermined rules of the configuration model for the outer VLAN tag.

* * * * *